July 1, 1924.
M. REGULA
LEATHER AND RUBBER ARTICLE
Filed Oct. 31, 1922
1,499,785
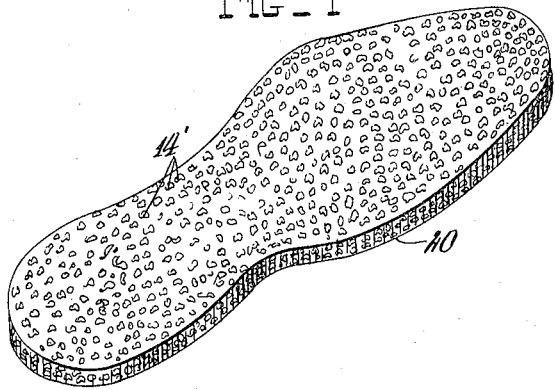
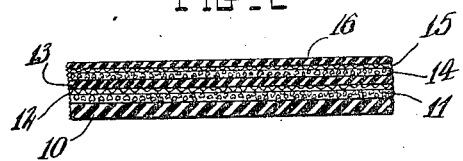
Inventor
Mathias Regula
By Zoltan Polachek
Attorney Patented July 1, 1924.

1,499,785

UNITED STATES PATENT OFFICE.

MATHIAS REGULA, OF NEW YORK, N. Y.

LEATHER AND RUBBER ARTICLE.

Application filed October 31, 1922. Serial No. 598,035.

*To all whom it may concern:*

Be it known that I, MATHIAS REGULA, a citizen of the United States, residing at New York, in the county of New York and State of New York, have invented certain new and useful Improvements in Leather and Rubber Articles, of which the following is a specification.

This invention relates to a leather and rubber compound adapted for use in the soles and heels of shoes, in mats, or in place of linoleum in different places, such as the running boards of automobiles.

The invention has for a general object to provide articles of the above type characterized by high durability and flexibility, and which are inexpensive to manufacture.

For further comprehension of the invention, and of the objects and advantages thereof, reference will be had to the following description and accompanying drawings, and to the appended claims in which the various novel features of the invention are more particularly set forth.

Fig. 1 of the drawings is a perspective view of a combination sole and heel such as are used on outing or sport shoes.

Fig. 2 is a sectional view showing a sheet of material constructed according to the invention.

In carrying out my invention I preferably make use of old leather, or scrap leather, which would otherwise be wasted. This scrap leather is first chopped up into small pieces, preferably from one-sixteenth to one-eighth of an inch in dimension.

This leather is then incorporated with the rubber, preferably in the following manner. The rubber employed is reduced to the condition of a paste in the usual manner, which paste is spread in a comparatively thick layer 10 on the bottom of a flat mold, a layer 11 of the comminuted leather, with the particles relatively spaced far apart from one another is then placed on top of this initial layer. A screen 12 of cotton thread is then placed over the layer of leather the meshes of the screen being preferably of approximately one-sixteenth inch dimension.
A second and thinner layer 13 of rubber paste is then placed on the screen 12. A second layer 14 of the comminuted leather is placed on the top rubber layer, the particles being spaced relatively close together. A second gauze screen 15 is placed on the top layer of leather and a third layer of rubber paste spread on the said screen.

The structure thus built up is first subjected to pressure in a mold and is then vulcanized. The resultant sheet of material may then be cut into suitable forms for such use as may be desired. With the arrangement as set forth I provide a tread surface of resilient rubber while at the same time the inner portion of the sheet is composed in increasing degree of the otherwise waste leather.

The screens act to hold the layers of leather in place while the rubber layers are being spread thereover while at the same time they offer no resistance to the uniting of the different layers under pressure into a solid mass, the rubber being forced between the particles of leather so as to unite the different layers together.

In Fig. 1 of the drawings I show a sole 20 for a shoe, particles 14' of the top layer of leather being indicated as forced through to the surface of the top layer 16 of rubber.

Having thus described my invention what I claim as new and desire to protect by Letters Patent of the United States is as follows:

1. A sheet of material made up of rubber and small particles of leather embedded in said rubber, the particles of leather being more closely spaced toward the inner face of the sheet.

2. A sheet of material made up of rubber and small particles of leather embedded in said rubber, the particles of leather being more closely spaced toward the inner face of the sheet, and a layer of pure rubber being formed at the outer face of the sheet.

3. The process of making a sheet of material which consists in superimposing successive layers of rubber paste and leather particles with the upper layer of leather particles more closely spaced than the lower layer, and subjecting the same to pressure.

4. The process of making a sheet of material which consists in spreading successive layers of rubber paste and leather particles, placing a textile screen over the layer of leather particles, spreading on said screen a second layer of rubber paste, placing on said last layer a second layer of leather particles more closely spaced than the first layer, covering said last layer with a textile screen, spreading on said screen another layer of rubber paste, and subjecting the whole mass to pressure.

In testimony whereof I have affixed my signature.

MATHIAS REGULA.